Patented July 22, 1930

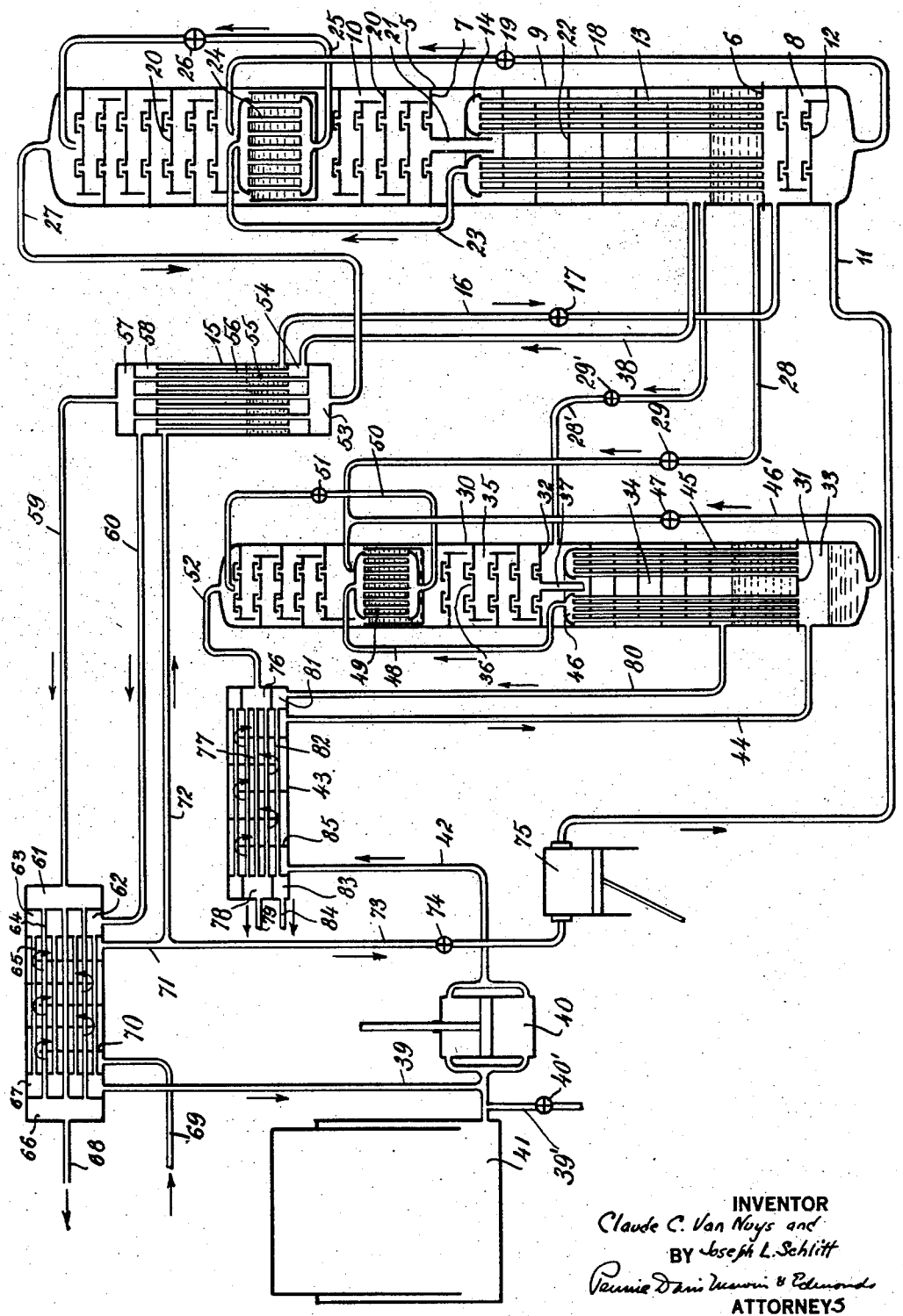

1,771,197

UNITED STATES PATENT OFFICE

CLAUDE C. VAN NUYS, OF CRANFORD, AND JOSEPH L. SCHLITT, OF ELIZABETH, NEW JERSEY, ASSIGNORS TO AIR REDUCTION COMPANY, INCORPORATED, OF NEW YORK, N. Y., A CORPORATION OF NEW YORK

SEPARATION OF THE CONSTITUENTS OF GASEOUS MIXTURES

Application filed October 23, 1926. Serial No. 143,593.

This invention relates to the separation of the constituents of gaseous mixtures, and particularly to the recovery of oxygen and nitrogen from the atmosphere.

In the ordinary method of treating air to separate oxygen and nitrogen therefrom the air is compressed and cooled and then expanded to obtain a liquid which is then rectified to separate nitrogen from a liquid which contains the oxygen and is vaporized to recover the oxygen. Thus, in the well known Claude method a liquid containing approximately 47% of oxygen is obtained by selective liquefaction of the entering gaseous air and this liquid is subjected to rectification with vapors formed at the lower part of the rectification column by evaporating a portion of the liquid produced by rectification. The more complete separation of the oxygen from the vapors rising through the column is accomplished by the introduction of a liquid consisting principally of nitrogen at the top of the column. By modifying the operation of the rectification column it is possible to obtain either substantially pure oxygen or substantially pure nitrogen, but the operation as conducted heretofore always involves a loss of one or the other of these elements. This is necessary because an excess of oxygen must be evaporated to ensure the complete removal of nitrogen from the descending liquid or an excess of nitrogen must be permitted to return with the liquid to ensure the complete removal of oxygen from the nitrogen product.

It is the object of the present invention to provide a simple and efficient method of an apparatus for separating the constituents of gaseous mixtures, and more particularly to permit the simultaneous recovery of two constituents of a gaseous mixture such as air in a substantially pure form.

Other objects and advantages of the invention will be apparent as it is better understood by reference to the following specification and accompanying drawing in which an apparatus adapted for the practice of the invention is illustrated diagrammatically. It should be observed that those details of the apparatus which are well understood by persons skilled in the art are omitted for the purpose of clarity.

In carrying out the invention the gaseous mixture, for example, air, is subjected to a primary liquefaction and rectification, and the rectification is so conducted as to separate one of the constituents, for example, nitrogen, in a condition of substantial purity. This can be accomplished readily so that an effluent consisting, for example, of substantially pure nitrogen, can be withdrawn continuously from the apparatus. The complementary liquid which results from the rectification will consist of oxygen but will contain substantial proportions of nitrogen and substantially all of the argon present originally in the air. A portion of this liquid is evaporated to provide the vapor necessary for the primary rectification. The surplus vapor so formed is withdrawn and utilized as hereinafter described. The unevaporated liquid is withdrawn and subjected to an auxiliary rectification to separate nitrogen and argon therefrom and to produce thereby a liquid consisting of substantially pure oxygen which is evaporated to produce one of the products of the operation. The auxiliary rectification is conducted at substantially the pressure which exists in the primary rectification. A portion of the surplus vapor hereinbefore mentioned is, however, recompressed and liquefied in the auxiliary column to produce a reflux liquid therein and to ensure the separation and recovery of substantially all of the oxygen in the air originally treated. Another portion of the vapor may be withdrawn and introduced into the auxiliary column at a proper level to assist in the rectification. The effluent from the auxiliary rectification consists of nitrogen, the argon originally present in the air, and possibly small amounts of oxygen which escape from the system. This effluent can be utilized for any desired purpose or discharged to the atmosphere. The operation results in the recovery of substantially all of the oxygen and nitrogen in the air treated and these products are of very high purity and are available for all of the numerous uses for which oxygen and nitrogen can be employed. Because of the recovery of large volumes of commercial gases the operation is highly efficient and economical.

The method as described is applicable as a modification of various methods of liquefaction and separation which are now in commercial use. One application in the modification of the well known Claude method involves the operation of a Claude column as indicated with an auxiliary rectifying column to accomplish the final separation of the constituents. In such a method air, for example, is compressed to a pressure sufficient to afford the necessary refrigerative effect in the system, and after cooling by heat exchange with outgoing products the air is separated into two parts, one part being delivered at the initial pressure to a liquefier wherein it is liquefied by heat exchange with the products of the column. This liquid is delivered to the bottom of the column. The other part of the entering air is expanded in a suitable engine or turbine to a materially lower pressure, and being thereby cooled it enters the bottom of the column with the liquid previously mentioned. The entering air then passes through a plurality of tubes in a vaporizer, the tubes being surrounded by liquid produced in the rectifying compartment of the column. The gas, such as air, is partially liquefied and the liquid returns and mixes with the liquid formed in the liquefier, producing thereby a liquid having approximately 47% of oxygen. This liquid is delivered to an intermediate level of the rectification column and flows downwardly therein in contact with vapors rising from the liquid in the vaporizer. The result is a rectification and consequent separation of nitrogen from the liquid. The uncondensed portion of the entering air in the tubes of the vaporizer is conducted to a condenser at an intermediate level of the rectifier and is there liquefied to produce a reflux consisting substantially of nitrogen. The reflux enters the top of the rectifier and flows downwardly therein in contact with the rising vapors, thereby washing oxygen from the vapors and replacing this element with nitrogen. As the result of effluent consisting of substantially pure nitrogen is formed and this escapes from the top of the rectifier, the rectification being so operated as to permit a proportion of the nitrogen to descend with the liquid which accumulates about the tubes of the vaporizer.

The liquid thus accumulated is partially vaporized for the purpose of the primary rectification. Owing to the fact that this liquid is utilized as a refrigerating agent for the incoming air, a surplus of vapor is produced and this surplus vapor is withdrawn; and after being reduced to atmospheric temperature by heat exchange with the incoming air it is recompressed and utilized in the auxiliary rectification as hereinafter described. As heretofore stated a portion of the surplus vapor may be introduced directly into the auxiliary column. The liquid which accumulates at the bottom of the primary rectifier is withdrawn and delivered at an intermediate level of an auxiliary rectifier wherein it descends in contact with vapors from the liquid produced by the auxiliary rectification. The auxiliary rectification results in the separation of nitrogen and argon from the liquid entering the auxiliary rectifier and consequently the resulting liquid is substantially pure oxygen. It is evaporated in the lower part of the auxiliary rectifier and is withdrawn as a product of the operation. To ensure maximum separation of the oxygen from the vapors rising through the auxiliary rectifier the surplus vapor from the primary rectifier, either with or without the addition of a quantity of the original gaseous mixture, such as air, after recompression as described, is cooled and delivered to the auxiliary column where it flows first through a plurality of tubes in heat exchange relation with the liquid descending through the column. A partial liquefaction thereof produces a liquid containing the oxygen present in this vapor together with some nitrogen, and this liquid is delivered to the intermediate level of the auxiliary rectifier with the liquid derived from the primary rectifier. The unliquefied residual gas passes through a condenser at an intermediate level of the column and is liquefied to produce a reflux consisting principally of nitrogen which is delivered to the top of the auxiliary rectifier and flows downwardly therein, thereby washing oxygen from the rising vapors and substituting nitrogen therefor. The resulting effluent consists of nitrogen and argon and is withdrawn from the top of the auxiliary rectifier.

From the foregoing it will be observed that the refrigeration necessary for the maintenance of the auxiliary column is derived principally from the primary column. With the exception of the small amount of power necessary to recompress the surplus vapor from the primary rectification it is not necessary to utilize an amount of power exceeding to any considerable extent the amount required to operate the primary column for the production of a single constituent of the gaseous mixture in substantial purity. The utilization of the auxiliary rectifier permits the economical recovery of two constituents of the gaseous mixture such as air in substantial purity.

An apparatus capable of operation in the manner last described is illustrated in the accompanying drawing in which 5 indicates a primary column which is divided by partitions 6 and 7 into compartments 8, 9 and 10, the latter being the rectifying section of the column. The cooled and expanded air enters the compartment 8 through a pipe 11, and after passing through a plurality of trays 12 in the compartment it enters a plurality of tubes 13 which extend through the compartment 9 to a header 14. In passing through the tubes the air is partially liquefied and returns in contact with the entering gaseous mixture to the trays 12 in the compartment 8. It is supplemented by liquid formed in a liquefier 15 and delivered through a pipe 16 controlled by a valve 17 to the compartment 8. The liquid accumulates in the bottom of the compartment 8 and may consist, as hereinbefore indicated, of approximately 47% of oxygen with the balance mostly nitrogen. The liquid passes through a pipe 18 having a pressure-reducing valve 19 to an intermediate level of the rectifier compartment 10 and descends therein over a plurality of trays 20 of the form usually employed in rectification apparatus. The liquid passes eventually through a tube 21 to a plurality of trays 22 in the compartment 9 and surrounds the tubes 13.

The unliquefied air which reaches the header 14 passes through a pipe 23 to a condenser 24 at an intermediate level of the rectifying compartment 10, and being there cooled by liquids accumulating in the compartment it is liquefied and delivered through a pipe 25 having a pressure-reducing valve 26 to the uppermost level of the rectifying compartment 10 wherein it descends over the trays 20. This liquid is substantially pure nitrogen and acts as a reflux for the vapors rising in the column. By suitable regulation of the operation these vapors when they reach the point of introduction of the liquid from the pipe 25 are also substantially pure nitrogen and this effluent escapes through a pipe 27.

The liquid accumulating in the bottom of the compartment 9 is partially evaporated and the remainder is withdrawn through a pipe 28 controlled by a valve 29 and is delivered at an intermediate level of an auxiliary rectifying column 30. This column is divided by partitions 31 and 32 into compartments 33, 34 and 35. The liquid descends in the compartment 35 over trays 36 and is subjected therein to vapors rising from the bottom of the column. This produces a rectification of the liquid and eliminates nitrogen and argon therefrom so that the liquid which finally descends through a pipe 37 into the compartment 34 of the column and accumulates therein is substantially pure oxygen.

The surplus vapor produced in the primary column escapes through a pipe 38 and after being warmed by contact with the incoming gaseous mixture as hereinafter described the vapors are delivered through a pipe 39 to a compressor 40, a gasometer or other equalizing device being connected to the compressor to permit operation thereof in the most efficient manner. A quantity of the gaseous mixture being treated, such as air, can be admitted to the auxiliary compressor through a pipe 39' controlled by a valve 40'. The compressed gaseous mixture passes through a pipe 42 and heat exchanger 43 and thence through a pipe 44 to the compartment 33 of the auxiliary column. A portion of the surplus vapor may be introduced directly into the auxiliary column by a pipe 28' controlled by a valve 29'. From this compartment the vapors pass upwardly through a plurality of tubes 45 which extend to a header 46 and are surrounded by the substantially pure oxygen liquid accumulating in the bottom of the column. A partial liquefaction of the vapors occurs with the production of a liquid which accumulates in the bottom of the auxiliary column and is delivered through a pipe 46' having a pressure-reducing valve 47 to an intermediate level of the rectifying compartment 35 together with the liquid introduced from the primary column.

The unliquefied residue of the vapors passes through a pipe 48 to a condenser 49 at an intermediate level of the rectifying compartment 35 and the liquid therein produced passes through a pipe 50 controlled by a pressure-reducing valve 51 to the uppermost level of the auxiliary column. The liquid produced, which is principally nitrogen with the argon originally present in the air, descends over the trays 36 and washes any remaining oxygen from the vapors rising through the column. The vapors which reach the level where the reflux nitrogen liquid is delivered to the auxiliary column contain nitrogen and argon and possibly traces of oxygen, and this gaseous mixture escapes through a pipe 52 from the top of the column.

The liquefier 15 is cooled by gaseous products of the primary rectification, delivered to compartments 53 and 54 thereof from the pipes 27 and 38. The gaseous products pass through tubes 55 and 56 in the liquefier to corresponding compartments 57 and 58 and the gases are delivered thence through pipes 59 and 60 to compartments 61 and 62 at one end of an exchanger 63. The gases pass through tubes 64 and 65 in the exchanger to corresponding compartments 66 and 67. From the compartment 66 the effluent, consisting of substantially pure nitrogen, is discharged through a pipe 68 to any suitable storage receptacle. The pipe 39 hereinbefore mentioned connects with the compartment 67 to deliver the vapors containing oxygen to the compressor 40.

The entering gaseous mixture, for example, air, after compressing and cooling is delivered through a pipe 69 to the exchanger 63, and after passing about baffles 70 therein is discharged to a pipe 71. A branch 72 connects this pipe with the liquefier 15 and the liquid formed from that portion of the air which is diverted to the liquefier is delivered through the pipe 16 as hereinbefore described. The balance of the air passes through a pipe 73 controlled by a valve 74 to an expansion engine or turbine 75 wherein the air is expanded and thereby cooled. The pipe 11 delivers the expanded and cooled air to the compartment 8 of the primary column.

The exchanger 43 is cooled by the products of the auxiliary rectification. The pipe 52 carrying the effluent of this rectification discharges into a compartment 76 at one end of the exchanger and the effluent passes through tubes 77 to a corresponding compartment 78. The effluent is discharged through a pipe 79 and may be stored or wasted as desired. A pipe 80 communicates with the compartment 34 of the auxiliary column and that portion of the vapor produced therein which is not utilized in the rectification and which consists of substantially pure oxygen is delivered through the pipe 80 to a compartment 81 at one end of the exchanger 43, and after passing through tubes 82 in the exchanger to a compartment 83 at the opposite end of the exchanger the gaseous oxygen escapes through a pipe 84 and may be delivered to any suitable storage receptacle. The compressed vapors entering the exchanger through the pipe 44 pass about a plurality of baffles 85 therein and escape through the pipe 44 as hereinbefore described.

The method and apparatus as described permit the continuous and progressive treatment of gaseous mixtures to obtain two of the constituents thereof in substantial purity and at a cost not materially exceeding the cost of separating one of these constituents by methods and apparatus heretofore employed. While the invention has been described with reference especially to the separation of the constituents of the atmosphere, it should be understood that it is applicable to the separation of constituents of other gaseous mixtures in which the physical properties of the constituents are related in such a way as to permit separation as in the case of oxygen and nitrogen of the atmosphere. Various changes may be made in the details of operation and in the arrangement of the apparatus employed without departing from the invention or sacrificing any of the advantages thereof.

We claim:—

1. The method of separating the constituents of gaseous mixtures, which comprises rectifying a liquid containing the constituents of the gaseous mixture to separate one of the constituents in substantial purity from a liquid containing principally another constituent, partially vaporizing the liquid resulting from the primary rectification by heat exchange with the incoming gaseous mixture, recompressing and liquefying a portion of the vapor and subjecting the liquid thus obtained to an auxiliary rectification with the balance of the liquid produced by the primary rectification.

2. The method of separating the constituents of gaseous mixtures, which comprises rectifying a liquid enriched in one of the constituents of the gaseous mixture to separate another constituent in substantial purity therefrom, partially vaporizing the liquid resulting from the primary rectification by heat exchange with the incoming gaseous mixture, recompressing and liquefying a portion of the vapor and subjecting the liquid thus obtained to an auxiliary rectification with the balance of the liquid produced by the primary rectification and another portion of the first-mentioned vapor.

3. The method of separating the constituents of gaseous mixtures, which comprises partially vaporizing a liquid resulting from a primary rectification by heat exchange with the incoming gaseous mixture, recompressing and liquefying a portion of the vapor and subjecting the liquid thus obtained to an auxiliary rectification with the balance of the liquid produced by the primary rectification.

4. The method of separating the constituents of gaseous mixtures, which comprises partially vaporizing a liquid resulting from a primary rectification by heat exchange with the incoming gaseous mixture, recompressing a portion of the vapor, subjecting the balance of the liquid to an auxiliary rectification, liquefying the recompressed vapor by heat exchange with the liquid undergoing auxiliary rectification and utilizing the liquid thus produced in the auxiliary rectification.

5. The method of separating the constituents of gaseous mixtures, which comprises rectifying a liquid containing the constituents of the gaseous mixture to separate one of the constituents in substantial purity from a liquid containing principally another constituent, partially vaporizing the liquid resulting from the primary rectification by heat exchange with the incoming gaseous mixture, recompressing a portion of the vapor, subjecting the balance of the liquid to an auxiliary rectification, liquefying the recompressed vapor by heat exchange with the liquid undergoing auxiliary rectification and utilizing the liquid thus produced in the auxiliary rectification.

6. The method of separating the constituents of gaseous mixtures, which comprises rectifying a liquid enriched in one of the constituents of the gaseous mixture to separate another constituent in substantial purity therefrom, partially vaporizing the liquid resulting from the primary rectification by heat exchange with the incoming gaseous mixture, recompressing a portion of the vapor, subjecting the balance of the liquid and another portion of the vapor to an auxiliary rectification, liquefying the recompressed vapor by heat exchange with the liquid undergoing auxiliary rectification and utilizing the liquid thus produced in the auxiliary rectification.

7. The method of separating the constituents of gaseous mixtures, which comprises rectifying a liquid containing the constituents of the gaseous mixture to separate one of the constituents in substantial purity from a liquid containing principally another constituent, partially vaporizing the liquid resulting from the primary rectification by heat exchange with the incoming gaseous mixture, recompressing a portion of the vapor, subjecting the balance of the liquid to an auxiliary rectification, liquefying the recompressed vapor in two stages, the first being selective, by heat exchange with the liquids undergoing auxiliary rectification and utilizing the liquids thus obtained in the auxiliary rectification.

8. The method of separating the constituents of gaseous mixtures, which comprises rectifying a liquid enriched in one of the constituents of the gaseous mixture to separate another constituent in substantial purity therefrom, partially vaporizing the liquid resulting from the primary rectification by heat exchange with the incoming gaseous mixture, recompressing a portion of the vapor, subjecting the balance of the liquid to an auxiliary rectification, liquefying the recompressed vapor in two stages by heat exchange with the liquid undergoing auxiliary rectification and utilizing the liquids thus obtained in the auxiliary rectification.

9. The method of separating the constituents of gaseous mixtures, which comprises rectifying a liquid containing the constituents of the gaseous mixture to separate one of the constituents in substantial purity from a liquid containing principally another constituent, partially vaporizing the liquid resulting from the primary rectification by heat exchange with the incoming gaseous mixture, recompressing and liquefying a portion of the vapor with an added quantity of the original gaseous mixture and subjecting the liquid thus obtained to an auxiliary rectification with the balance of the liquid produced by the primary rectification.

10. The method of separating the constituents of gaseous mixtures, which comprises partially vaporizing a liquid resulting from a primary rectification by heat exchange with the incoming gaseous mixture, recompressing and liquefying a portion of the vapor with an added quantity of the original gaseous mixture and subjecting the liquid thus obtained to an auxiliary rectification with the balance of the liquid produced by the primary rectification.

11. The method of separating the constituents of gaseous mixtures, which comprises partially vaporizing a liquid resulting from a primary rectification by heat exchange with the incoming gaseous mixture, recompressing a portion of the vapor with an added quantity of the original gaseous mixture, subjecting the balance of the liquid to an auxiliary rectification, liquefying the recompressed vapor and gaseous mixture by heat exchange with the liquid undergoing auxiliary rectification and utilizing the liquid thus produced in the auxiliary rectification.

12. The method of separating the constituents of gaseous mixtures, which comprises rectifying a liquid containing the constituents of the gaseous mixture to separate one of the constituents in substantial purity from a liquid containing principally another constituent, partially vaporizing the liquid resulting from the primary rectification by heat exchange with the incoming gaseous mixture, recompressing a portion of the vapor with an added quantity of the original gaseous mixture, subjecting the balance of the liquid to an auxiliary rectification, liquefying the recompressed vapor and added gaseous mixture by heat exchange with the liquid undergoing auxiliary rectification and utilizing the liquid thus produced in the auxiliary rectification.

13. The method of separating the constituents of gaseous mixtures, which comprises rectifying a liquid containing the constituents of the gaseous mixture to separate one of the constituents in substantial purity from a liquid containing principally the other constituent, partially vaporizing the liquid resulting from the primary rectification by heat exchange with the incoming gaseous mixture, recompressing a portion of the vapor with an added quantity of the original gaseous mixture, subjecting the balance of the liquid to an auxiliary rectification, liquefying the recompressed vapor and added gaseous mixture in two stages, the first being selective, by heat exchange with the liquid undergoing auxiliary rectification and utilizing the liquids thus obtained in the auxiliary rectification.

14. In an apparatus for separating the constituents of gaseous mixtures, the combination of primary and auxiliary rectification columns, means for delivering liquid produced in the primary column to the auxiliary column, means for withdrawing and recompressing vapor produced in the primary column, heat exchange means whereby the recompressed vapor is liquefied and means for delivering the liquid thus produced to the auxiliary rectification.

15. In an apparatus for separating the constituents of gaseous mixtures, the combination of primary and auxiliary rectification columns, means for delivering liquid produced in the primary column to the auxiliary column, means for withdrawing and recompressing vapor produced in the primary column, heat exchange means within the auxiliary column whereby the recompressed vapor is liquefied and means for delivering the liquid thus produced to the auxiliary rectification.

16. In an apparatus for separating the constituents of gaseous mixtures, the combination of primary and auxiliary recification columns, means for delivering liquid produced in the primary column to the auxiliary column, means for withdrawing and recompressing vapor produced in the primary column, a plurality of heat exchange means whereby the recompressed vapor is liquefied, means for separately collecting the liquids produced in the heat exchange means and means for delivering the liquids thus produced to the auxiliary rectification.

17. In an apparatus for separating the constituents of gaseous mixtures, the combination of primary and auxiliary rectification columns, means for delivering liquid produced in the primary column to the auxiliary column, means for withdrawing and recompressing vapor produced in the primary column, a plurality of heat exchange means within the auxiliary column whereby the recompressed vapor is liquefied, means for separately collecting the liquids produced in the heat exchange means and means for delivering the liquids thus produced to the auxiliary rectification.

18. In an apparatus for separating the constituents of gaseous mixtures, the combination of primary and auxiliary rectification columns, means for delivering liquid produced in the primary column to the auxiliary column, means for withdrawing and recompressing vapor produced in the primary column, means for introducing an additional quantity of the original gaseous mixture to the vapor before compression thereof, heat exchange means whereby the recompressed vapor and added gaseous mixture are liquefied and means for delivering the liquid thus produced to the auxiliary rectification.

19. In an apparatus for separating the constituents of gaseous mixtures, the combination of primary and auxiliary rectification columns, means for delivering liquid produced in the primary column to the auxiliary column, means for withdrawing and recompressing vapor produced in the primary column, means for introducing an additional quantity of the original gaseous mixture to the vapor before compression thereof, heat exchange means within the auxiliary column whereby the recompressed vapor and added gaseous mixture are liquefied and means for delivering the liquid thus produced to the auxiliary rectification.

In testimony whereof we affix our signatures.

CLAUDE C. VAN NUYS.
JOSEPH L. SCHLITT.